United States Patent [19]
Baughman

[11] 3,930,931
[45] Jan. 6, 1976

[54] APPARATUS AND METHOD FOR STRIPPING STYRENE FROM AN AQUEOUS DISPERSION OF STYRENE-BUTADIENE POLYMER LATEX

[75] Inventor: Lawrence C. Baughman, Akron, Ohio

[73] Assignee: The General Tire & Rubber Company, Akron, Ohio

[22] Filed: June 7, 1974

[21] Appl. No.: 477,399

Related U.S. Application Data

[63] Continuation of Ser. No. 344,816, March 26, 1973, abandoned.

[52] U.S. Cl. .............. 159/4 ST; 159/D10; 159/4 B; 159/6 R
[51] Int. Cl.² ........................ B01D 1/16; B01D 1/22
[58] Field of Search...... 159/D10, 16 S, 48 R, 28 R, 159/47 R, 28 C, 48 L, 27 R, 28 A, 3, 4 MS, 4 B, 6 R

[56] References Cited
UNITED STATES PATENTS

| | | | |
|---|---|---|---|
| 2,572,321 | 10/1951 | Deanesly............................ | 159/47 R |
| 2,726,198 | 12/1955 | Lowman, Jr. et al............... | 202/236 |
| 2,925,127 | 2/1960 | Sargent et al....................... | 159/3 X |
| 3,365,808 | 1/1968 | James, Jr. et al................... | 34/9 |
| 3,453,184 | 7/1969 | Gemassmer et al. ............... | 203/88 |
| 3,469,617 | 9/1969 | Palmason........................... | 159/47 R |
| 3,512,570 | 5/1970 | Ess et al.............................. | 252/361 |
| 3,630,262 | 12/1971 | Macek ............................... | 159/27 R |
| 3,815,655 | 6/1974 | Burke, Jr........................... | 159/4 VM |

FOREIGN PATENTS OR APPLICATIONS
259,497 10/1926 United Kingdom..................... 159/5
1,019,482 2/1966 United Kingdom.......... 159/DIG. 10

Primary Examiner—Jack Sofer
Attorney, Agent, or Firm—F. C. Rote, Jr.; James M. Peppers

[57] ABSTRACT

An apparatus and method are disclosed for removing unreacted monomer and other volatile material from an aqueous dispersion of polymeric substance. An aqueous dispersion containing volatile material to be stripped is injected into a substantially unrestricted contacting tube along with a stripping gas such as steam to provide within the contacting tube a high velocity vaporous mixture of aqueous dispersion and stripping gas. The vaporous mixture is maintained under a pressure above atmospheric and preferably greater than 5 psi gauge within the contacting tube a time sufficient to permit absorption of volatiles from the dispersion to the stripping gas and preferably to permit saturation equilibrium to be approached. The vaporous mixture is discharged from the contacting tube through a nozzle into a substantially unrestricted post-contacting tube, which is maintained below atmospheric pressure, and preferably is impinged against a baffle means. Thereafter, the vaporous mixture is discharged from the post-contacting tube into a separator chamber that is maintained at a sufficient pressure below atmospheric to flash volatiles from the mixture. The volatiles and stripping gas are then removed from the separator chamber separate from the stripped aqueous dispersion. The stripping may be thereupon repeated to further reduce the residual volatiles within the aqueous dispersion.

7 Claims, 1 Drawing Figure

APPARATUS AND METHOD FOR STRIPPING STYRENE FROM AN AQUEOUS DISPERSION OF STYRENE-BUTADIENE POLYMER LATEX

This is a continuation of application Ser. No. 344,816, filed Mar. 26, 1973, now abandoned.

FIELD OF THE INVENTION

The present invention relates to an improvement in the removal of unreacted monomer and other volatile material from aqueous dispersions of polymeric substances.

BACKGROUND OF THE INVENTION

Stripping is a term used in the polymer industry to describe removal of certain unreacted monomer and other volatile material from the mass of reacted, i.e. polymerized, material. The stripping occurs while the polymeric material is in an aqueous dispersion called a "latex". A stripping gas such as steam is mixed with the dispersion and retained in that condition long enough for substantial amounts of the volatile material from the polymeric material to be absorbed into the gas. Ideally, saturation equilibrium is reached during the dispersion-gas retention to maximize the stripping efficiency.

Stripping processes are particularly useful in separating unreacted styrene from styrene-butadiene polymer latex. The polymer exists as an emulsion of rubber particles in water phase and reference to an aqueous dispersion in this specification and claims means such an emulsion as commonly understood in the art of producing polymer latices. Whether the polymerization is to low conversion, e.g. 60–70%, or to high conversion, e.g. 95–98%, substantial amounts of unreacted monomer still remain within the product at the end of the polymerization. The monomer must be removed not only to provide a high quality polymeric product having no undesirable odor, degradation, and the like, but to attain greater economies by recovery of the monomer for reuse. Butadiene can be readily removed by flashing it off in a vacuum chamber because it is highly volatile. Styrene, on the other hand, having a boiling point higher than water, must be removed by stripping. Because of its relative inexpensiveness and compatibility with the polymerization chemistry, steam is usually and typically used as the stripping gas in stripping processes. Typically, the residual styrene in the polymer product must be reduced to levels of about 0.02–0.05% by weight for the polymer to be acceptable for commercial use.

The most direct method of stripping has been to distill the latex under reduced pressure. In this process, latex is introduced batchwise into a vacuum vessel and agitated to achieve good contact with steam which is introduced at the bottom of the vessel. Steam enriched with the volatile material is drawn off at the top of the vessel under vacuum. Due to the character of the dispersion, this process is very slow and difficult to operate. Excessive foaming and coagulation occurs making the process unsatisfactory for large scale commercial production because of the constant loss of polymer.

It has been proposed to make the distillation continuous while eliminating foaming and coagulation by simultaneously injecting latex and steam through an externally heated tube in a liquid-in-gas mixture. The steam is saturated with volatile material while the latex is partially evaporated along the length of the tube. Upon discharge from the heated tube, the volatile-laden steam is immediately separated from the latex by one or more flash and cyclone separators, see e.g. U.S. Pat. No. 2,467,769.

In this process, unrestricted passages through the heated tube are required to prohibit build-up of back pressure and in turn avoid coagulation and foaming. The latex is forced to flow along the walls of the tube at relatively high velocities so that boiling occurs along the walls of the tube without coagulation of the latex or formulation of a coagulated film on the heated surface. The turbulent high velocity flow also breaks up any bubbles which are produced within the tube and thus prevents the formation and build-up of foam. Although this process is operative, it is inefficient and commercially unsatisfactory. Very large amounts of steam are needed to strip a given amount of polymer, and large amounts of heat must be externally introduced into the system aside from the latent heat of the stripping gas and latex.

The most prevalently used commercial method of stripping is called "flash stripping". The flash stripper utilizes the principle of continuously mixing a stream of carrier gas, typically steam, with a stream of aqueous dispersion in such ratios that a liquid-in-gas or vaporous mixture is provided. The vaporous mixture is then continuously flashed into a vacuum chamber where the volatile-laden stripping gas evaporates and is drawn off separate from the dispersion. Successive stages may be employed to reduce the volatile material to the desired residual level.

The difficulty with flash stripping has been that it is only as good as the contacting step prior to flashing. Saturation equilibrium must be approached in the contacting step in as short a period of time as possible to provide a unit of commercial efficiency. Logically this is accomplished by free and unrestricted passage through a long tube with a minimum of pressure drop, while external heat is added for the formation of vapor. However, inordinate amounts of steam and an excessive number of stages are needed to reduce the residual contact of the volatile materials to an acceptable level with such a contacting technique.

It has been proposed to achieve a rapid and uniform vaporous mixture of the aqueous dispersion of polymeric substance in the stripping gas by restricting the flow through a tortuous path, see U.S. Pat. Nos. 3,073,380 and 3,469,617 to Palmason. That is, the dispersion-gas mixture is passed through a tortuous path of relatively narrow elongated crosssection at high velocity, while inputting heat to the mixture to effect volatilization during confinement. The velocity of the mixture through the tortuous path is maintained so that the disposition of coagulant upon the surfaces which define the passageways is inhibited and the mixture is discharged from the end of the tortuous path with the vapors above ambient temperature. The mixture is immediately injected into a vacuum chamber where the volatiles are flash evaporated and drawn off together with the stripping gas under vacuum.

Although providing improved efficiency when operating, the "tortuous path" strippers present serious difficulties in manufacture and in operation. Specifically, the tortuous path contacting section is expensive to build and therefore involves a relatively large capital outlay. Moreover, because of plugging in the tortuous pathways, it requires the operation to be shut down frequently and for relatively long periods of time while the contacting section is cleaned and regasketed. The reliability of the unit is thus low and the maintenance costs excessive. The efficiency of such stripping units can be increased by maintaining extra contacting sections which can be inserted into the system to keep the stripper in operation. But this further increases both the capital outlay and maintenance requirements.

SUMMARY OF THE INVENTION

The present invention provides an efficient method and means of removing volatile materials from an aqueous dispersion of polymeric substance which is contemplated as being an improvement to the apparatus and method disclosed in the above referenced U.S. Pat. No. 3,469,617 to Palmason. No clogging and attendant downtime is encountered with the present system, while the operating efficiency of the stripping is maintained and increased. The system is extremely simple to build and easy to maintain. Moreover, no heat source is needed in the present invention aside from the latent heat of the stripping gas and aqueous dispersion.

The stripping process of the present invention comprises injecting into the enlongated contacting chamber of a substantially unrestricted contacting tube an aqueous dispersion containing volatile material along with stripping gas such as steam to provide a high velocity turbulent vaporous mixture within the contacting tube. The stripping gas and aqueous dispersion may be separately mixed before injection, but preferably the stripping gas is simultaneously mixed with the dispersion upon injection into the contacting tube. In the latter instance, the stripping gas is preferably injected at a velocity above 100 feet per second to provide the high velocity turbulent mixture within the contacting tube.

The vaporous mixture is maintained in the contacting tube for a time sufficient to permit substantial volatiles from the aqueous dispersion to be absorbed into the stripping gas. For efficiency, the retention time in the contacting tube is preferably for a period sufficient for saturation equilibrium to be approached. The retention time is controlled by the dimensions and notably the length of the contacting tube and the amount of back pressure. Preferably, no heat is supplied to the contacting tube except through the latent heat in the stripping gas and aqueous dispersion. The residence in the contacting tube is accomplished by a back pressure above atmospheric; lower pressures have been found to result in poor stripping.

The vaporous gas-dispersion mixture is discharged from the contacting tube through a nozzle, preferably against a baffle means, into a post-contacting tube. The post-contacting section is maintained at a pressure substantially below atmospheric so that a substantial pressure drop of preferably greater than 5 psi gauge and most desirably above 15 psi gauge is maintained across the nozzle.

The gas-dispersion mixture is then discharged into a separator chamber which is maintained at a sufficient pressure below atmospheric to flash volatiles from the mixture. The volatiles and stripping gas are thus easily removed under vacuum from the separator separate from the aqueous dispersion. Preferably the flash evaporation and separation are accomplished by maintaining a pressure differential between the separator chamber and the exterior thereof of between 15 and 25 inches of mercury. The optimum pressure, however, either within or without this range, will depend on the composition of the stripping gas, the aqueous dispersion, and the flow conditions in the system.

In operation, the present invention provides a minimum pressure drop through the contacting tube consistent with maintaining velocity and turbulence through the contacting tube sufficient to minimize coagulations and foaming, and a relatively large pressure drop of preferably at least about 5 psi and most desirably about 15 to 35 psi across the nozzle at the exit of the contacting tube into a post-contacting tube. The gas-dispersion mixture can thus be retained in the contacting tube under relatively high pressure and temperature without the addition of sensible heat for efficient stripping of volatiles from the aqueous dispersion. Further, the gas-dispersion mixture is subjected to a throttling of explosive action exiting through the nozzle into the post-contacting tube. Preferably, the vaporous mixture is impinged against a baffle means as it is discharged through the nozzle to further add to the explosive action of the mixture passing through the nozzle into the reduced pressure and further increase the stripping efficiency.

The residual volatiles in the aqueous dispersion may upon separation be sufficiently low for the intended purposes of the polymer. However, if it is not, the process may be repeated in two or more stages until the residual volatiles have been reduced to a suitable level.

Other details, objects and advantages of the invention will become apparent as the following description of the presently preferred embodiments proceeds.

BRIEF DESCRIPTION OF THE DRAWINGS

In the accompanying drawings the present preferred embodiments of the invention and present preferred methods of practicing the same proceeds in which.

DESCRIPTION OF THE PREFERRED EMBODIMENTS

Figure 1:
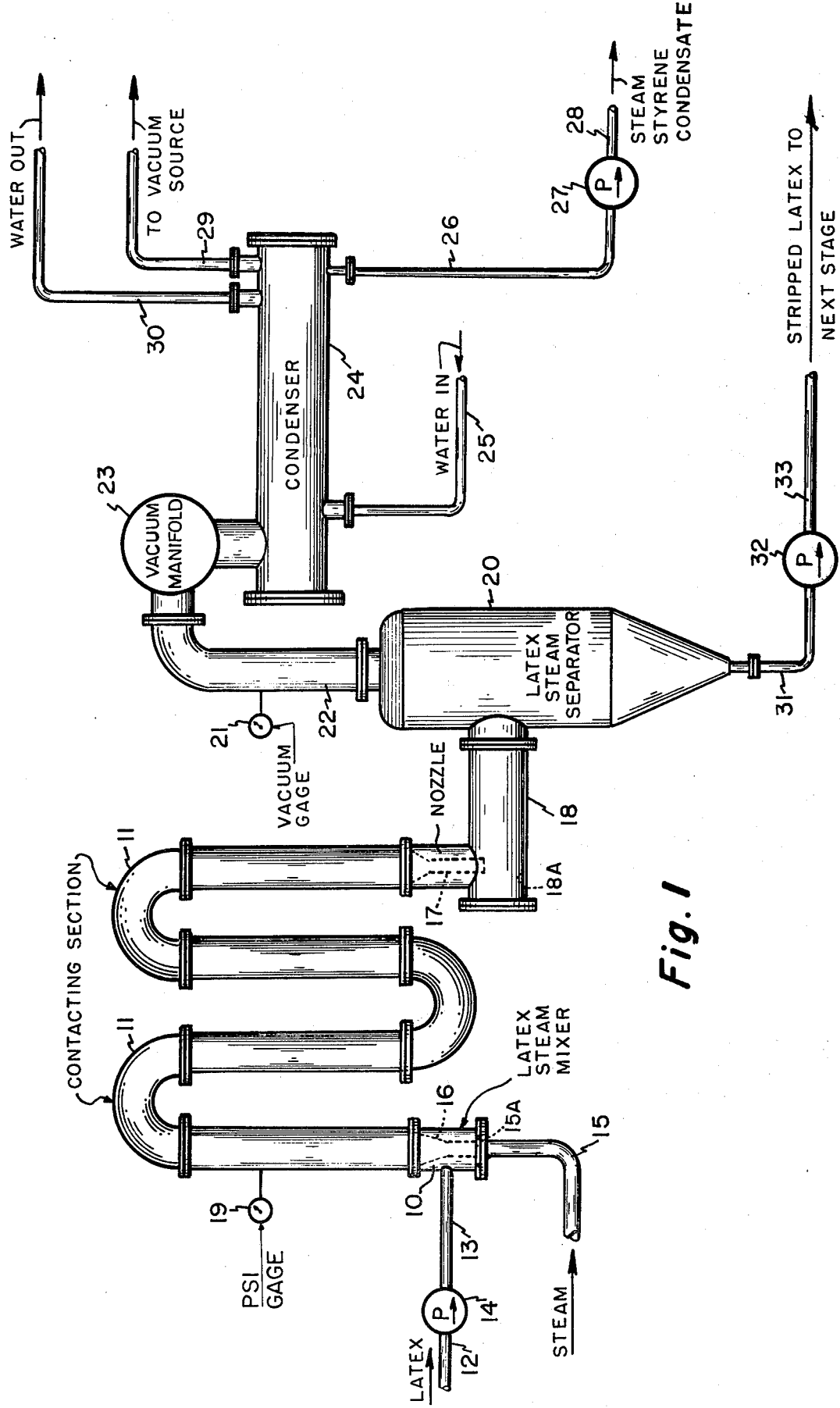
FIG. 1 is a diagrammatic view of a stripping process in accordance with the present invention.

Referring to FIG. 1, the stripping process is specifically described with reference to the removal of unreacted styrene monomer from an aqueous dispersion (i.e. latex) of butadiene-styrene copolymer using steam as a carrier gas.

A vaporous mixture of latex and steam is formed in mixing chamber 10 which comprises the input end of substantially unrestricted contacting tube 11 which, as shown in FIG. 1, defines an open and elongated pressurable contacting chamber. The latex containing the styrene monomer to be stripped is fed to the system through pipelines 12 and 13 via feed pump 14. Typically the feed pump supplies the feed latex at 20 gpm with a pressure head of about 40 psi. The latex may also at this point pass through a preheater (not shown) to add to the latent heat of the latex, in which instance, the pressure head from the feed pump is typically about 50 psi to compensate for the pressure drop across the preheater. The latex is injected into the mixing chamber 10 tangentially or peripherally, typically at 5 to 10 feet per second. The steam is supplied to mixing chamber 10 axially through pipeline 15 at high velocity preferably greater than 100 feet per second through nozzle 16. Preferably, the latex is thereupon injected into the steam through a gap 15A, typically of about ¼ to ⅜ inch, between the nozzle 16 and the end plate of chamber 10, by Venturi action of the steam as it passes by the gap at high velocity. A high velocity turbulent vaporous mixture of steam and latex is thus injected into the contacting tube 11.

The vaporous mixture of latex and steam is maintained in the contacting tube 11 under pressure above atmospheric for sufficient length of time to permit the steam to absorb styrene monomer from the latex. To provide for efficient stripping, as hereinafter described, the styrene level in the steam is permitted to approach saturation equilibrium. This is accomplished primarily by sizing the contacting tube 11 both in length and diameter but most notably in length. Typically the contacting tube is 5 inches in diameter and 10 to 30 feet in length. The length varies widely because of the wide variation in styrene content in the feed latex. The lower the styrene content in the feed latex the longer the contacting tubes must be to provide for longer retention time and in turn efficient stripping. For this reason, longer contacting tubes are needed in the latter stages of stripping to remove the same percent of styrene from the latex. It should also be noted that the contacting tube 11 is preferably a single, or as shown, a double U-shaped tube to conserve space.

The retention time can also be increased by increasing the pressure in contacting tube 11. This can be accomplished simply by sizing later described nozzle 17. However, the pressure which can be maintained in tube 11 is limited by the discharge pressure head of feed pump 14. Therefore, the pressure in contacting tube 11 measured at pressure gauge 19 is preferably above 5 psi gauge and most desirably between 10 and 15 psi gauge when the latex is not preheated. When the latex is preheated, the measured pressure at gauge 19 is preferably increased by the pressure drop across the preheater which is typically 10 psi. Higher pressures, even greater than 25 psi, may be desirable in certain applications to speed the stripping process with the maximum pressure dependent on the nature of the aqueous dispersion and of the stripping gas.

From the contacting tube 11, the vaporous mixture is discharged through nozzle 17 into unrestricted post-contacting tube 18. Nozzle 17 is sized in accordance with the desired flow rate through a system and the desired pressure in the contacting tube and pressure drop across the nozzle. Typically, nozzle 17 is about 1.5 inch in diameter or about 30% of the diameter of contacting tube 11 to provide about 10 psi gauge pressure in the contacting tube.

Post-contacting tube 18 is maintained substantially below atmospheric pressure so that a substantial pressure drop is provided across nozzle 17 of typically 15 to 35 psi. Tube 18 is typically the same diameter as contacting tube 11, although it may vary in size as desired. It has been found that a diameter of 8 inches and a length on the order of 1 to 4 feet is suitable for tube 18. Its function is to confine the vaporous mixture at the emergence from the throttling action as it passes through the nozzle 17 and before discharge into vacuum chamber 20.

It should be noted that nozzle 17 may be placed in different relation to tube 18 than as shown. For example, nozzle 17 may be placed in a horizontal position in tube 18. In any case, nozzle 17 is preferably positioned so that the vaporous mixture exiting from the nozzle impinges on a baffle means. As shown the baffle means 18A is the side of tube 18. Where nozzle 17 is placed in a horizontal position in tube 18, it is contemplated that the baffle means may be the baffles (not shown) providing for tangential-vortex inlet to vacuum chamber 20. Although this aspect is not essential to the operation of the process, it is believed to add to the stripping efficiency of the process.

The vaporous mixture is then discharged into the vacuum chamber 20 which is a standard flash separator vessel. That is, the inlet is baffled (not shown) so that the vaporous mixture is tangentially injected into chamber 20 to swirl along the inner sides thereof. Chamber 20 is maintained at a pressure substantially below atmospheric by drawing a vacuum at the top through pipe 22. Preferably, the pressure differential between the separator and the exterior thereof is between about 15 and 25 inches of mercury and most desirably between 20 and 25 inches of mercury, for example, as read at vacuum gauge 21. The actual vacuum or pressure will depend on the volatiles to be flashed and the percent of solids desired in the latex. For example, if only unwanted gases such as butadiene are to be stripped 15 inches of mercury is satisfactory. Typically the vacuum pressure is maintained between 23 and 25 inches of mercury. The precise vacuum will, however, vary with the solid content desired for a given latent heat of the aqueous dispersion and stripping gas. In this connection, it should be noted that solid contents between 49 and 51% by weight in butadiene-styrene latex product is standard in the industry. Higher percent solids may be appropriate with other latices, e.g., 60% with chloroprene. But for butadienestyrene latex, about 50–55% is the highest percentage which can be tolerated without encountering coagulation.

The volatiles in the mixture are flashed off and separately removed along with the steam through pipes 22 and vacuum manifold 23 to a condenser 24. In condenser 24 the styrene and steam are condensed by circulation through standard heat exchange coils with water circulation around the coils. The water enters through pipeline 25 and exits through pipeline 30. After condensation in condenser 24, the styrene ladened condensate is directed through pipeline 26, pump 27 and pipeline 28 to a separator, while the vacuum is returned to a vacuum pump (not shown) through pipe 29.

Meanwhile the stripped latex is removed from the vacuum chamber 20 through pipe 31, pump 32 and pipe 33. If the residual styrene content is sufficiently low, the latex may be removed from the system for sale or coagulation. Otherwise, the latex may be passed to a second or subsequent stage identical to the one above described starting with feed styrene through pipe 12, perhaps with the addition of preheater as above described to compensate for the cooling in the flash separator.

The present system has been found in stripping butadiene-styrene latex to have greater efficiency than prior systems. Using the system described, it has been found that styrene can be reduced by a factor of three in each stage of a three stage stripping system. For example, 1% styrene in the butadiene-styrene latex fed to the system is reduced to 0.3% in the first stage, 0.1% in the second stage, and 0.03% in the third stage. Moreover, it has been standard with the apparatus described in U.S. Pat. No. 3,469,617 to require 2 pounds of steam to strip 1 pound of latex. With the present invention the ratio of steam to latex has been found to approach 1:1.

This increased efficiency is believed to result from an increased amount of styrene content in the steam discharged from the system. If saturation equilibrium could be reached, it is possible for the steam leaving the system to have 14 times as much styrene as the aqueous portion of the latex. With the system of U.S. Pat. No. 3,469,617, it has been typical for the steam discharging the system to have 7 times as much styrene as the aqueous portion of the latex or about 50% of the saturation maximum. With the present invention the existing steam has been found to have up to 10 times as much styrene as the aqueous portion of the latex or 50 to 80% of the saturation maximum.

These efficiencies are, however, not absolutes. Variables in the system can change the efficiency drastically. For example, if the styrene content of the incoming latex is higher, higher efficiencies will be provided whether the system be the present invention or prior techniques. Further, if more stages are added to the system to further reduce the residual styrene, the efficiencies will be reduced because of the reduction in styrene content of the latex fed to the later stages of the system.

The mechanism by which these higher efficiencies are attained are not entirely known. It is believed that they result from the contacting of vaporous mixture of steam and latex at relatively high temperature (i.e. 212° to 270°F) and relatively high pressure (e.g. 15 to 30 psi absolute) for a relatively long period in contacting tube 11, coupled with the explosive action as the vaporous mixture passes through the nozzle 17. However, whatever the mechanism or the efficiencies, it is clear that the present invention substantially advances the art by eliminating cumbersome and unreliable apparatus.

It is to be noted that the foregoing pressures and temperatures as specified may be conveniently converted into generally equivalent metric terms by applying the following conversion factors:

Fahrenheit Degree — Minus 32 × 0.555 = Centigrade Degree.

Inch — × 2.54 = Centimeter (cm).

Pound/Square Inch (psi) — × 70.3 = Gram/Square/-Centimeter (gm/cm²)

While presently preferred embodiments have been shown and described, it is distinctly understood that the invention may be otherwise variously embodied and used within the scope of the following claims.

What is claimed is:

1. In apparatus adapted to remove a volatile material from an aqueous dispersion of particles of a polymeric material wherein the volatile material has a boiling point higher than the water phase of such dispersion, such as for removing styrene from an aqueous latex dispersion of a styrene-butadiene polymer, the combination comprising:
   a. a vaporous mixture contacting tube means requiring no external heating and defining an elongated and substantially open and unrestricted pressurable contacting chamber;
   b. mixing means connected with one end of said contacting tube means and adapted to mix said dispersion in heated condition with a hot stripping gas to form a vaporous mixture and to inject said vaporous mixture into said contacting chamber to form a turbulent flow of said vaporous mixture through said chamber with said vaporous mixture being maintained at a temperature range of about 212°F–270°F (100°C–132°C) and at a selected pressure above about 5 psig (35 KPa);
   c. said contacting chamber being of width selected to permit substantially unrestricted flow and minimum pressure drop of the turbulent flow of said vaporous mixture through said chamber and of length selected to permit an optimum approach to substantially equilibrium saturation of said volatile material into said stripping gas;
   d. post contacting tube means connected into a standard flash separator means having vacuum producing means adapted to maintain said post contacting tube means and the chamber of said separator means at a vacuum of about 15–25 inches (38–64 cm) of mercury to separate said volatile material along with said stripping gas from said aqueous dispersion;
   e. flow throttling discharge nozzle means connected between said vaporous mixture contacting tube means and said post contacting tube means and adapted to discharge said vaporous mixture from said contacting chamber into said post contacting tube means with the size of said nozzle means being selected to cause said vaporous mixture to discharge and expand into the vacuum within said post contacting tube means with an explosive expansion action and also to maintain said selected pressure within said contacting chamber in combined action with said mixing means;
   f. means for removing said aqueous dispersion separated as a liquid from said separator means and for separately removing said volatile material along with said stripping gas from said separator means.

2. The apparatus of claim 1 wherein the size of said discharge nozzle means is selected to discharge said mixture through said discharge nozzle with a differential pressure of at least about 15 psi (105 KPa) existing between said chamber and said post contacting tube means.

3. The apparatus of claim 1 wherein said contacting tube means is in proportion of about 5 inches (12.7 cm) in width and about 10 to 30 feet (3.05–9.15 m) in length.

4. The apparatus of claim 3 wherein said mixing means and said flow discharge means are adapted in combination to form the turbulent flow of said vaporous mixture in a temperature range of about 212° – 270°F. (100° – 132°C.) and at a pressure above about 5 psig (35 KPa) and wherein said separator means is adapted to maintain a vacuum in the range of about 15–25 inches (38–64 cm) of mercury.

5. The apparatus of claim 3 wherein said vaporous mixture contacting tube means includes one or more U-tubes defining a portion of said contacting chamber.

6. The apparatus of claim 3 wherein said mixing means and said flow discharge means are adapted in combination to form the turbulent flow of said vaporous mixture in a temperature range of about 212° – 270°F. (100° – 132°C.) and at a pressure above about 5 psig (35 KPa).

7. The apparatus of claim 6 wherein the size of said discharge nozzle means is selected to discharge said mixture through said discharge nozzle with a differential pressure of at least about 15 psi (105 KPa) existing between said chamber and said post contacting tube means.

* * * * *